(12) United States Patent
Nishimura

(10) Patent No.: US 10,277,844 B2
(45) Date of Patent: Apr. 30, 2019

(54) PROCESSING IMAGES BASED ON GENERATED MOTION DATA

(71) Applicant: Intel Corporation, Santa Clara, CA (US)

(72) Inventor: Jun Nishimura, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 15/133,455

(22) Filed: Apr. 20, 2016

(65) Prior Publication Data

US 2017/0310909 A1    Oct. 26, 2017

(51) Int. Cl.
| | |
|---|---|
| *H04N 5/357* | (2011.01) |
| *G06T 5/00* | (2006.01) |
| *G06T 5/20* | (2006.01) |
| *G06T 7/20* | (2017.01) |
| *H04N 9/04* | (2006.01) |
| *H04N 9/64* | (2006.01) |

(52) U.S. Cl.
CPC .............. *H04N 5/357* (2013.01); *G06T 5/002* (2013.01); *G06T 5/20* (2013.01); *G06T 7/20* (2013.01); *H04N 9/045* (2013.01); *H04N 9/64* (2013.01); *G06T 2207/10004* (2013.01); *G06T 2207/20024* (2013.01); *G06T 2207/20182* (2013.01)

(58) Field of Classification Search
CPC ........... H04N 5/357; G06T 5/002; G06T 7/20; G06T 5/20; G06T 2207/20182; G06T 2207/10004; G06T 2207/20024
See application file for complete search history.

(56) References Cited

U.S. PATENT DOCUMENTS

| | | | | |
|---|---|---|---|---|
| 8,718,328 | B1* | 5/2014 | Gaddy | G06K 9/00624 |
| | | | | 375/240.16 |
| 9,106,926 | B1* | 8/2015 | Li | H04N 19/553 |
| 9,449,371 | B1* | 9/2016 | Sheng | G06T 5/002 |
| 9,602,763 | B1* | 3/2017 | Cheng | H04N 7/014 |
| 9,691,133 | B1* | 6/2017 | Liu | G06T 3/4076 |
| 2010/0321583 | A1 | 12/2010 | Shields et al. | |
| 2011/0019082 | A1* | 1/2011 | Su | G06T 5/002 |
| | | | | 348/441 |
| 2011/0050993 | A1* | 3/2011 | Wang | H04N 5/145 |
| | | | | 348/452 |
| 2012/0044998 | A1 | 2/2012 | Kokaram | |
| 2013/0329063 | A1 | 12/2013 | Zhou | |
| 2014/0050390 | A1 | 2/2014 | Beeler et al. | |
| 2014/0199048 | A1* | 7/2014 | Nobori | H04N 7/183 |
| | | | | 386/278 |
| 2015/0110190 | A1* | 4/2015 | Sartor | H04N 19/527 |
| | | | | 375/240.16 |

FOREIGN PATENT DOCUMENTS

EP        2680567 A1    1/2014

OTHER PUBLICATIONS

PCT International Search Report, PCT Application No. PCT/US2017/015032, dated May 2, 2017, 3 pages.

* cited by examiner

*Primary Examiner* — Mekonnen D Dagnew
(74) *Attorney, Agent, or Firm* — International IP Law Group, P.L.L.C.

(57) ABSTRACT

An example apparatus for image processing includes a motion-adaptive image enhancer to receive motion data and an image with reduced noise. The motion-adaptive image enhancer can process an occluded region of the image based on the motion data. The motion-adaptive image enhancer can generate an enhanced image.

15 Claims, 7 Drawing Sheets

400

PROCESSING IMAGES BASED ON GENERATED MOTION DATA

BACKGROUND ART

Imaging devices may include imaging signal processors (ISPs) to process data captured by light sensors. ISPs may include an ISP pipeline of various processing stages. For example, the pipeline may include a noise reduction stage and an image enhancement stage.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

As discussed above, ISPs may include a number of processing stages. The stages may be arranged in a pipeline, which can allow concurrent processing of the stages. In conventional ISPs, an image enhancement stage may be applied to captured sensor data before a temporal noise reduction (TNR) stage. For example, the image enhancement stage may apply sharpening to the data before being processed at the TNR stage for removal of noise. However, in extremely low light situations, such as light conditions below 0.1 luminous flux (lux), the noise in occluded regions of a captured frame may cause problems with noise removal. Occluded regions, as used herein, refer to areas of an image that may have been blocked or shadowed by a moving object. For example, objects in an image may be moving to cause the occluded regions and therefore there may not be a match between an input frame and a previous reference frame. For example, since temporal noise reduction may not reduce the noise at occluded regions where there are no good temporal matches between the input and the reference, a strong noise in the occluded regions may remain, while other parts of the image having matches may have lower noise levels. The gaps between these noise levels may appear highly unnatural to a viewer.

Some other conventional ISPs may apply image enhancement after noise removal, for example at the very end of an ISP pipeline. However, this may still result in noise in occluded regions being amplified. For example, applying image enhancement after noise removal may not avoid amplifying the noise in the occluded regions without degrading the overall image enhancement level of the image. The amplified noise in the occluded regions may be perceptually bothering for a user.

The present disclosure relates generally to techniques for temporal noise reduction and motion-adaptive image enhancement. Specifically, the techniques described herein include an apparatus, method and system for enhancing an image based on detected motion data. In some examples, motion data may be generated and used for temporal smoothing at a temporal noise reduction stage. Furthermore, in some examples, the motion data may be used at a motion-adaptive image enhancement stage. The techniques described herein enable low noise output in occluded regions of a captured image. As used herein, an image, also referred to herein as a frame, refers to a set of image sensor data captured at a particular time. Thus, the techniques described herein may result in more perceptually acceptable video quality. Additionally, the techniques may enable higher flexibility and video quality. For example, using the techniques described herein, a level of image enhancement may be maintained while avoiding amplification of noise in occluded regions.

Figure 1:
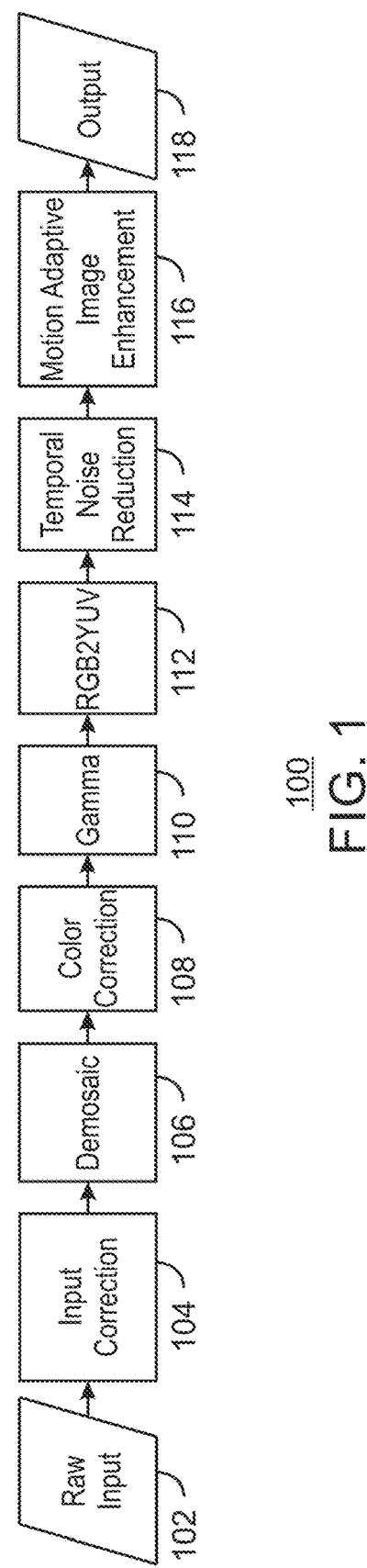
FIG. 1 is a block diagram illustrating an example image processing pipeline including motion-adaptive image enhancement.

FIG. 1 is a block diagram illustrating an example image signal processing pipeline including motion-adaptive image enhancement. The example pipeline is referred to generally by the reference number 100 and can be implemented using the imaging device 502 of FIG. 5 below. For example, the example pipeline 100 can be implemented in the ISP 504 of the image device 502 below.

The example pipeline 100 includes a raw input 102, an input correction stage 104, a demosaic stage 106, a color correction stage 108, a gamma stage 110, a color space conversion stage 112, a temporal noise reduction stage 114, a motion adaptive image enhancement stage 116, and an output stage 118. In some examples, the operation of stages 104-116 may operate concurrently on different images or frames.

As shown in FIG. 1, an input 102 is received at the input correction stage 104. For example, the input may be a raw input such as sensor data from a number of imaging sensors. In some examples, the input correction stage 104 may include a lens shading correction. For example, an image may be bright in the center and decrease in brightness towards the edge of the field-of-view. The input correction stage 104 can make the level of brightness even in the image. In some examples, the input correction stage 104 can also include defect pixel correction, black level correction, among other suitable corrections. The output corrected data from the input correction stage 104 can be sent to the demosaic stage 106. In some examples, the demosaic stage 106 may reconstruct a full color image from the incomplete color samples output from an image sensor overlaid with a color filter array (CFA). The full color image from the demosaic stage 106 may be sent to the color correction stage 108. In some examples, the color correction stage 108 may correct color issues in the received frames. The color corrected frames from the color correction stage 108 may be sent to the gamma stage 110. In some examples, the gamma stage 110 may correct gamma levels of received frames. The output frames from the gamma stage 110 may be sent to the color space conversion stage 112. In some examples, the color space conversion stage 112 may convert received frames from one color space into another color space. For example, the received frames may be received in the RGB color space and converted into the YUV color space, wherein a luma (Y) component determines brightness of color and two chrominance (U and V) components determine color. The output frame of the color space conversion stage 112 may be sent to the temporal noise reduction stage 114.

In some examples, the temporal noise reduction stage 114 may reduce temporal noise in the received frames. For example, the temporal noise reduction stage 114 may perform temporal smoothing. In some examples, the temporal noise reduction stage 114 may generate motion data used to perform temporal smoothing. For example, the temporal noise reduction stage 114 may perform temporal smoothing by applying a temporal low pass filter on the motion data. The operation of the temporal noise reduction stage 114 is discussed in greater detail with respect to FIG. 2 below.

The frames with reduced noise and the motion data from the temporal noise reduction stage 114 of the pipeline 100 may be sent to the motion-adaptive image enhancement stage 116 for further image processing. In some examples, the motion-adaptive image enhancement stage 116 may perform motion-adaptive image enhancement on received frames. For example, the motion-adaptive image enhancement stage 116 may sharpen one or more occluded regions based on the motion data. In addition, the motion-adaptive enhancement stage 116 can enhance color. For example, the motion-adaptive enhancement stage 116 can make colors more vivid without amplifying chrominance noise. The enhanced frames from the motion-adaptive image enhancement stage 116 can be output 118 as processed frames. In some examples, the processed frames can be joined and displayed as a video. In some examples, the processed frames may be still frames that can be saved to memory after being output.

The diagram of FIG. 1 is not intended to indicate that the example pipeline 100 is to include all of the components shown in FIG. 1. Rather, the example pipeline 100 can be implemented using fewer or additional components not illustrated in FIG. 1 (e.g., additional stages, input, output, etc.).

Figure 2:
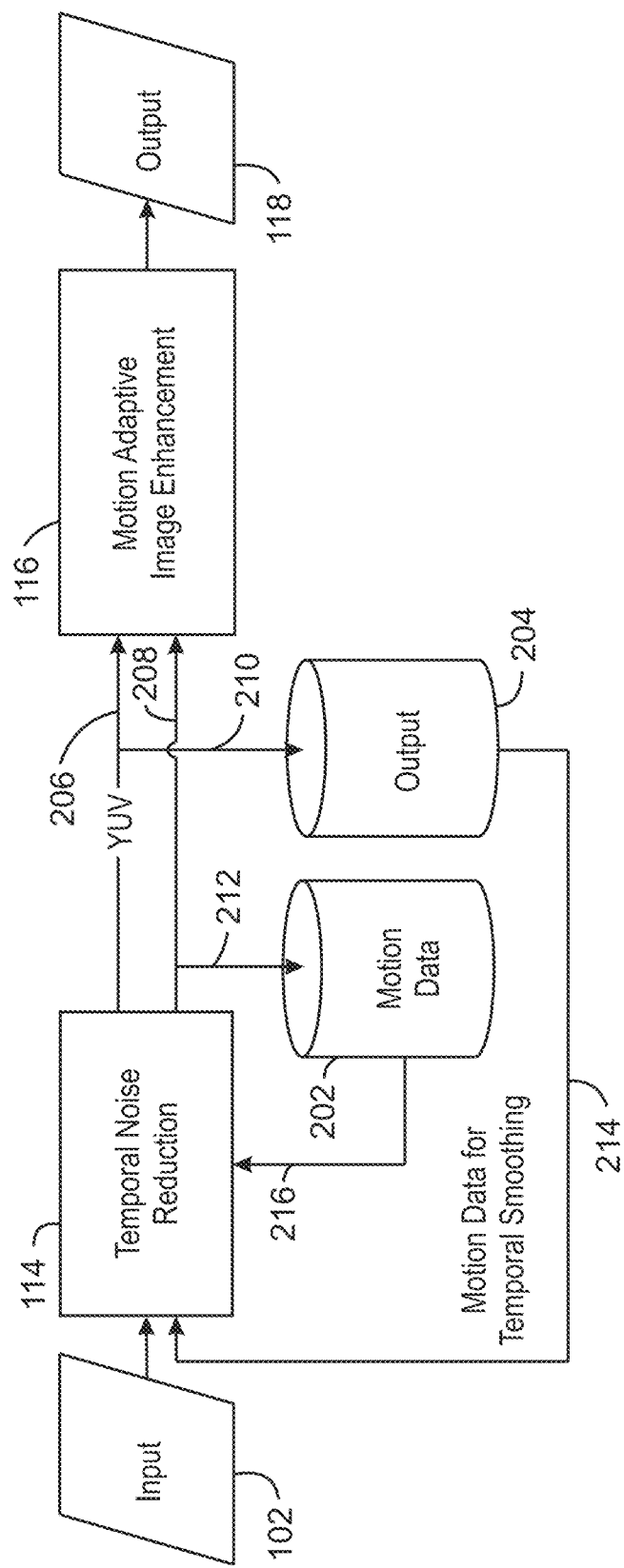
FIG. 2 is a detailed block diagram illustrating example temporal noise reduction and motion-adaptive image enhancement stages of an example pipeline.

FIG. 2 is a detailed block diagram illustrating example temporal noise reduction and motion-adaptive image enhancement stages of an example pipeline. The example pipeline is referred to generally by the reference number 200 and can be implemented using the imaging device 500 of FIG. 5 below. For example, the example pipeline 200 can be implemented in the ISP 504 of the image device 502 below.

The example pipeline 200 includes an input 102, a temporal noise reduction stage 114, a motion-adaptive image enhancement stage 116, an output 118, motion data buffer 202, and an output frame buffer 204. In some examples, the input 102 may be pre-processed by earlier stages of a pipelined ISP, such as a lens shading correction stage, a demosaic stage, among other suitable stages.

In FIG. 2, the temporal noise reduction stage 114 is shown receiving input 102 and sending noise reduced frames and motion data to the motion-adaptive image enhancement stage 116 as indicated by arrows 206 and 208, respectively. The noise reduced frames may also be saved as output 204 as shown by arrow 210 and sent back into the temporal noise reduction stage 114 as indicated by an arrow 214. The frames received from output 204 can be used to generate motion data. For example, the motion data can generated based on a Sum of the Absolute Difference (SAD) between an input frame and a reference frame. In some examples, the temporal noise reduction stage 114 can store a previous frame's motion data output into a buffer 202. The motion data in the buffer 202 can be used for enabling temporal smoothing of the motion data. For example, temporal smoothing may be applied over one or more previous frames. In some examples, certain image regions may be occluded by some moving objects. For example, those regions may be noisy for a certain number of consecutive frames. In order to propagate the information that the certain regions were occluded in the past, temporal smoothing of the motion data may be employed. In some examples, the motion data stored in the buffer 202 can be at much lower resolution than the input images. For example, a 60 decibel (dB) gain may be equivalent to a gain of ×1024, including both digital and analog gains. In some examples, temporal smoothing can be carried out by applying temporal low pass filter on the motion data.

The diagram of FIG. 2 is not intended to indicate that the example pipeline 200 is to include all of the components shown in FIG. 2. Rather, the example pipeline 200 can be implemented using fewer or additional components not illustrated in FIG. 2 (e.g., additional stages, buffers, input, output, etc.).

Figure 3:
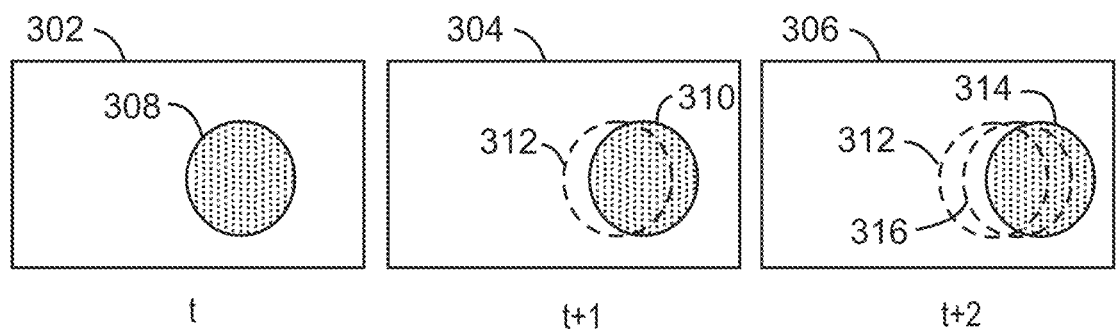
FIG. 3 is a block diagram of an example set of consecutively captured frames to be processed.

FIG. 3 is a block diagram of an example set of consecutively captured frames to be processed. The example set of captured frames is generally referred to by the reference number 300 and can be processed using the ISP 502 of FIG. 5 below.

The set of captured frames 300 includes a first frame 302, a second frame 304, and a third frame 306. The first frame 302 includes a static image of a moving object 308. The second frame includes the moving object 310 in a new location, and an occluded region 312 indicated by a dashed circle where the moving object 310 was previously in frame 302. The third frame 306 includes the moving object 314 in another location, with the previously occluded region 312 and a newly occluded region 316 indicated by dashed circles.

At time t, the moving object 308 is captured in a frame 302. At time t+1, the moving object 310 has moved to the right, producing an occluded region 312. At time t+2, the moving object 314 has moved further to the right, producing a second occluded region 316. At previously hidden regions, the TNR stage may not be able to reduce noise because there is no good matching between the input image 304 at time t+1 and previous output image 302 taken at time t. At time t+2, the region 312 will be less noisy than at t+1 because the TNR may start to take effect, but it will be noisier than other static regions where moving objects did not pass by in the past. At time t+2, occluded region 316 may be noisy due to same reason that region 312 is noisy at frame t+1. When the moving objects pass by and cause regions to be occluded, the regions previously hidden stay noisier than static regions for some time. In some examples, motion-adaptive image enhancement can help avoid amplifying these noisier regions. Thus, the present techniques may be particularly beneficial at extreme low light conditions. In normal light conditions, the noise itself may be very low, and thus the noise may not be highly visible. In some examples, the generated noise can be reduced using the techniques described herein.

Figure 4:
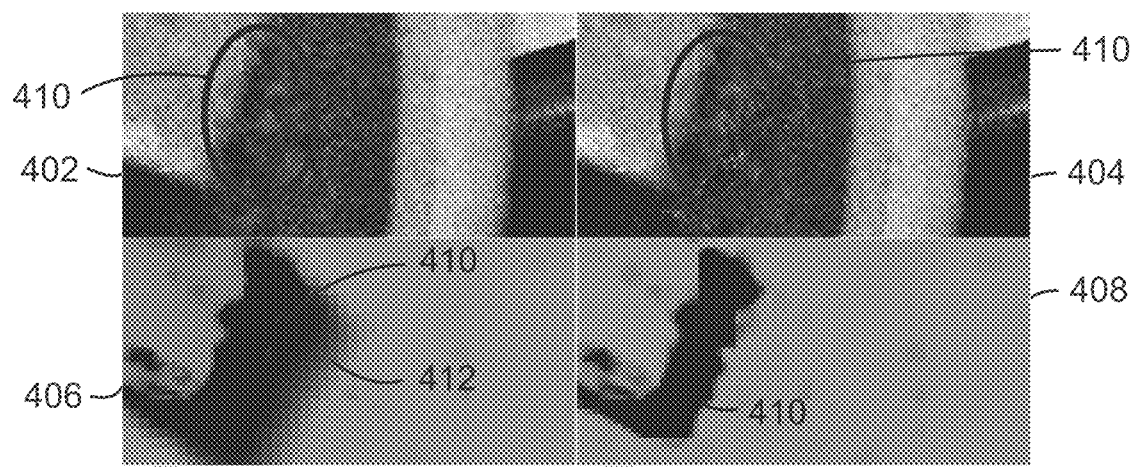
FIG. 4 is a pair of comparisons illustrating a detailed portion of an image with and without temporal smoothing.

FIG. 4 is a pair of comparisons illustrating example processed images with and without temporal smoothing. The set of example processed images is generally referred to by the reference number 400. For example, the temporal smoothing can be implemented via the ISP 504 of the image device 502 below.

The example set of processed images 400 includes a color image 402 with temporal smoothing, a color image 404 without any temporal smoothing, a motion data image 406 with temporal smoothing, and a motion image 408 without temporal smoothing.

In the example set of processed images 400, a first image 402 shows a close-up of an image with temporal smoothing. In particular, an occluded region of the image appears smooth. By contrast, the second image 404 shows an occluded region with visible lines along the edges of the occluded region. The motion data image 406 corresponding to the first image 402 shows the temporal smoothing 412 that has been applied around the edges of the occluded region 410. By contrast, the motion data image 408 corresponding to the second image 404 shows the lack of temporal smoothing at the occluded region 410. Thus, temporal smoothing 412 may result in an image 412 with less artifacts generated at the edges of occluded regions 410.

The diagram of FIG. 4 is not intended to indicate that the example processed images is to include all of the components shown in FIG. 4. Rather, the example processed images can be processed using fewer or additional components to produce effects not illustrated in FIG. 4 (e.g., additional pipeline stages, etc.).

Figure 5:
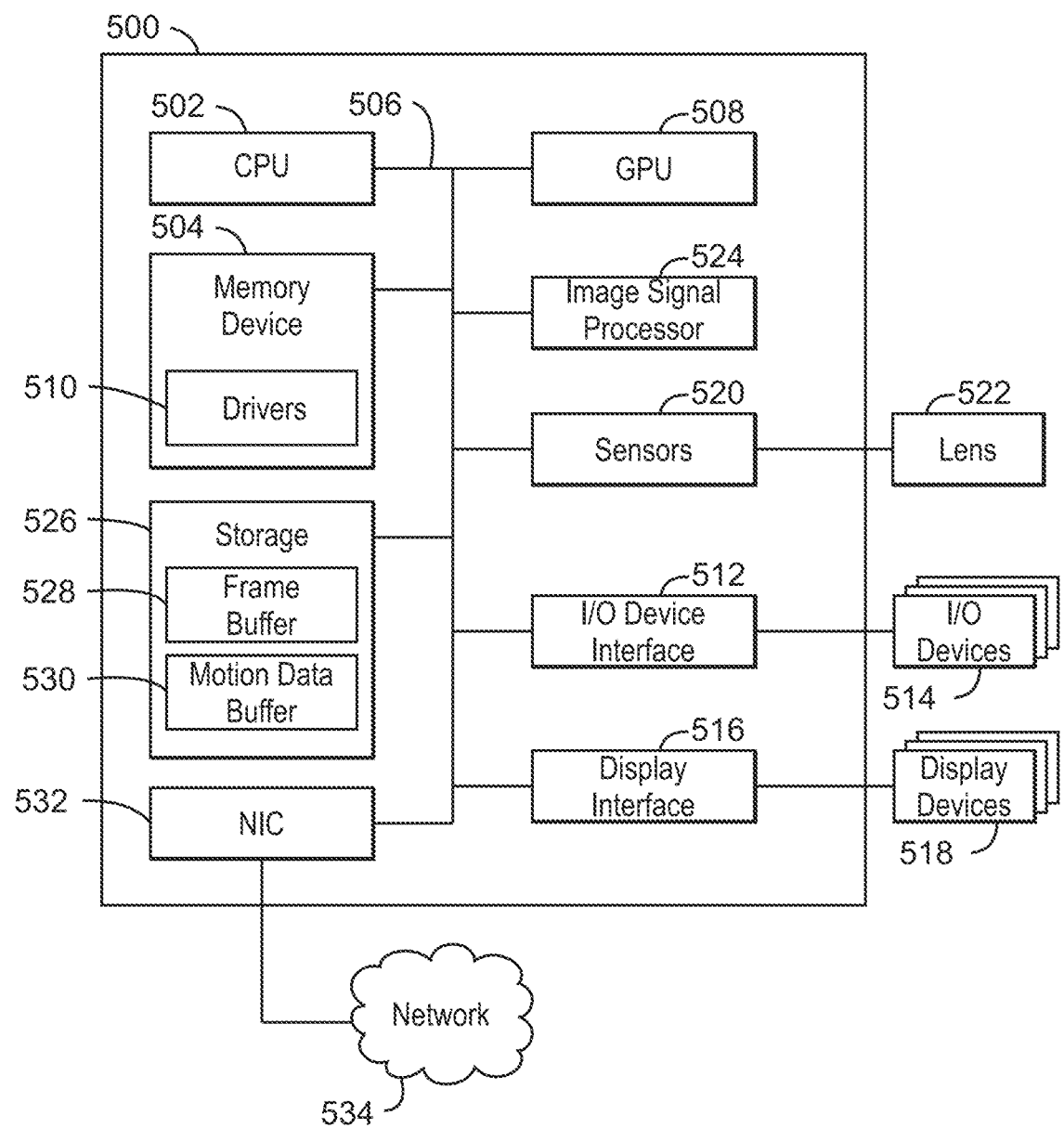
FIG. 5 is block diagram illustrating an example imaging device that can process images based on motion data.

Referring now to FIG. 5, a block diagram is shown illustrating an example imaging device that can process images based on motion data. The imaging device 500 may be, for example, a laptop computer, desktop computer, tablet computer, mobile device, or camera, among others. In some examples, the imaging device 500 may be a smart camera or a digital security surveillance camera. The imaging device 500 may include a central processing unit (CPU) 502 that is configured to execute stored instructions, as well as a memory device 504 that stores instructions that are executable by the CPU 502. The CPU 502 may be coupled to the memory device 504 by a bus 506. Additionally, the CPU 502 can be a single core processor, a multi-core processor, a computing cluster, or any number of other configurations. Furthermore, the imaging device 500 may include more than one CPU 502. In some examples, the CPU 502 may be a system-on-chip (SoC) with a multi-core processor architecture. In some examples, the CPU 502 can be a specialized digital signal processor (DSP) used for image processing. The memory device 504 can include random access memory (RAM), read only memory (ROM), flash memory, or any other suitable memory systems. For example, the memory device 504 may include dynamic random access memory (DRAM).

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for device discovery. The device drivers 510 may be software, an application program, application code, or the like.

The imaging device 500 may also include a graphics processing unit (GPU) 508. As shown, the CPU 502 may be coupled through the bus 506 to the GPU 508. The GPU 508 may be configured to perform any number of graphics operations within the imaging device 500. For example, the GPU 508 may be configured to render or manipulate graphics images, graphics frames, videos, or the like, to be displayed to a user of the imaging device 500.

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for generating virtual input devices. The device drivers 510 may be software, an application program, application code, or the like.

The CPU 502 may also be connected through the bus 506 to an input/output (I/O) device interface 512 configured to connect the imaging device 500 to one or more I/O devices 514. The I/O devices 514 may include, for example, a keyboard and a pointing device, wherein the pointing device may include a touchpad or a touchscreen, among others. The I/O devices 514 may be built-in components of the imaging device 500, or may be devices that are externally connected to the computing device 500. In some examples, the memory 504 may be communicatively coupled to I/O devices 514 through direct memory access (DMA).

The CPU 502 may also be linked through the bus 506 to a display interface 516 configured to connect the imaging device 500 to a display device 518. The display device 518 may include a display screen that is a built-in component of the imaging device 500. The display device 518 may also include a computer monitor, television, or projector, among others, that is internal to or externally connected to the imaging device 500.

The CPU 502 may be linked through the bus 506 to sensors 520. The sensors may detect light from lens 522. For example, the lens 522 can include one or more glass elements that can be adjusted to focus light onto the sensor 520. The sensors 520 can also be linked through the bus 506 to the CPU 502.

The imaging device further includes an image signal processor 524. For example, the image signal processor 524 may include an image processing pipeline. The pipeline may include a number of processing stages. In some examples, the stages may process frames in parallel.

The imaging device 500 also includes a storage device 526. The storage device 526 is a physical memory such as a hard drive, an optical drive, a thumbdrive, an array of drives, a solid-state drive, or any combinations thereof. The storage device 526 may also include remote storage drives. The storage device 526 may include a frame buffer 522. The frame buffer 522 can store video frames or images received from the image signal processor. For example, the stored frames may be used by the image signal processor 524 to generate motion data. The storage device 526 also may include a motion data buffer 530. The motion data buffer 530 can store motion data received from the image signal processor 524. For example, the motion data may be used by the image signal processor 524 to generate temporally smoothed motion data.

The imaging device 500 may also include a network interface controller (NIC) 532. The NIC 532 may be configured to connect the imaging device 500 through the bus 506 to a network 534. The network 534 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The block diagram of FIG. 5 is not intended to indicate that the imaging device 500 is to include all of the components shown in FIG. 5. Rather, the imaging device 500 can include fewer or additional components not illustrated in FIG. 5, such as additional buffers, additional processors, and the like. The imaging device 500 may include any number of additional components not shown in FIG. 5, depending on the details of the specific implementation. Furthermore, any of the functionalities of the CPU 502 may be partially, or entirely, implemented in hardware and/or in a processor. For example, the functionality of the frame buffer 522 may be implemented with an application specific integrated circuit, in logic implemented in a processor, in logic implemented in a specialized graphics processing unit such as the image signal processor 524, or in any other device.

Figure 6:
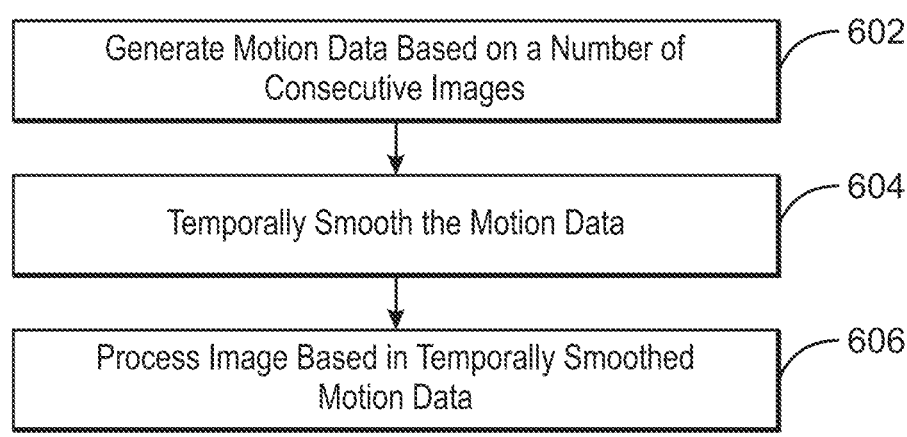
FIG. 6 is a flow chart illustrating a method for processing images based on motion data.

FIG. 6 is a flow chart illustrating a method for processing images based on motion data. The example method is generally referred to by the reference number 600 and can be implemented using the imaging device 500 of FIG. 5. For example, the method can be performed by the image signal processor 504 of FIG. 5 above.

At block 602, the image signal processor generates motion data based on a number of consecutive images. For example, the image signal processor can calculate the sum of an absolute difference between an input frame and a reference frame. For example, the sum of absolute differences (SAD) value oat position (x, y) can be calculated using the equation:

$$SAD(x,y)=\Sigma_{j=-N}^{N}\Sigma_{i=-N}^{N}|I_{in}(x+j,y+i)-I_{ref}(x+j,y+i)| \qquad \text{Eq. 1}$$

where N is the width and height of the region to calculate the SAD for (x, y), $I_{in}$ is the input image, and $I_{ref}$ is the reference image. In some examples, the image signal processor can generate motion data with a resolution lower than a resolution of the image. In some examples, the motion data can be used to detect one or more occluded regions in an image to be processed.

At block 604, the image signal processor temporally smoothens the motion data. For example, the image signal processor can apply a temporal low pass filter on the motion data.

At block 606, the image signal processor processes an image based on temporally smoothed motion data. For example, the image signal processor can avoid amplifying the noise in an occluded region of the image. In some examples, the image signal processor can sharpen an occluded region of the image based on temporally smoothed motion data. In some examples, the image signal processor can de-saturate color in the occluded regions based on the smoothed motion data, while enhancing color at static regions. For example, the occluded regions may tend to have very high color noise. In some examples, the image signal processor may avoid amplification of color in an occluded region.

This process flow diagram is not intended to indicate that the blocks of the example process 600 are to be executed in any particular order, or that all of the blocks are to be included in every case. Further, any number of additional blocks not shown may be included within the example process 600, depending on the details of the specific implementation. For example, generating the motion data can be performed after a temporal noise reduction and before a motion-adaptive image enhancement. In some examples, generating the motion data may be performed as part of a temporal noise reduction and before a motion-adaptive image enhancement. Further, the method may include generating an enhanced image based on the temporally smoothed motion data. For example, the enhanced image may have occluded regions with less noise than images not processed based on the temporally smoothed motion data.

Figure 7:
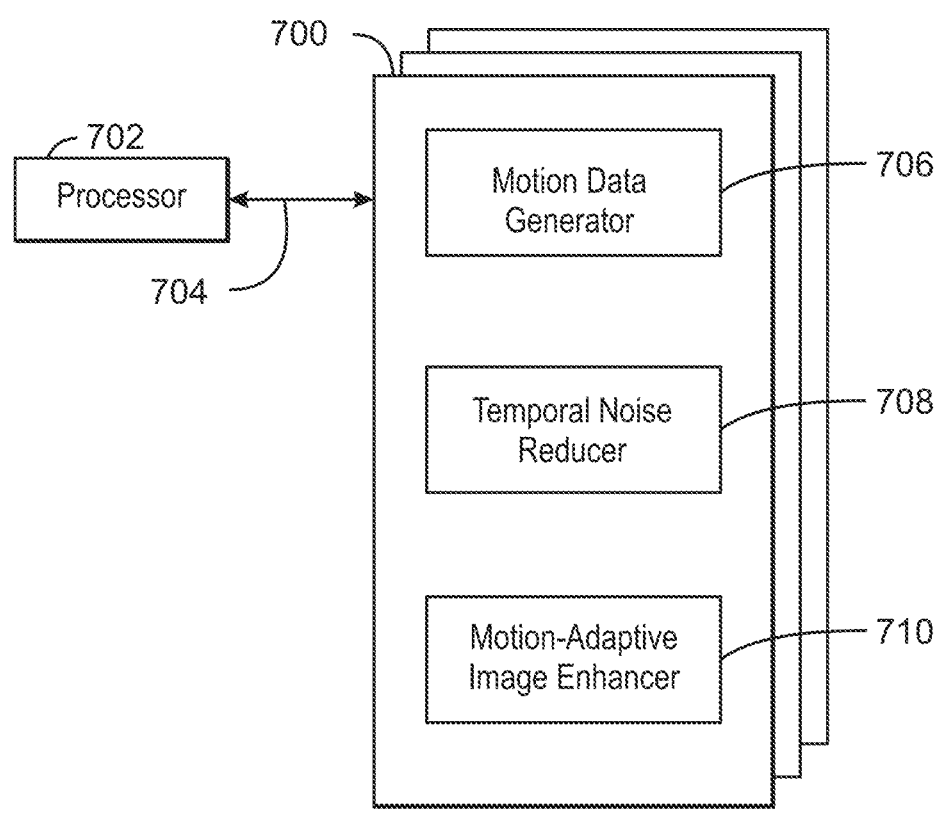
FIG. 7 is a block diagram showing computer readable media that store code for processing images using motion data.

FIG. 7 is a block diagram showing computer readable media 700 that store code for processing images using motion data. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media. However, in any case, the computer readable media do not include transitory media such as carrier waves, signals, and the like.

The various software components discussed herein may be stored on one or more computer readable media 700, as indicated in FIG. 7. For example, a motion data generator 706 may be configured to generate motion data based on a plurality of consecutive images. For example, the motion data generator 706 may be configured to sum an absolute difference between an input image and a reference image. In some examples, the motion data generator 706 may generate motion data with a resolution lower than a resolution of the image. A temporal noise reducer 708 may be configured to temporally smooth the motion data. For example, the temporal noise reducer 708 may apply a temporal low pass filter on the motion data. In some examples, the temporal noise reducer 708 may also process an image based on the temporally smoothed motion data. For example, the temporal noise reducer 708 may perform temporal noise reduction on the image. In some examples, the temporal noise reducer 708 can also detect an occluded region in the image based on the motion data. For example, the temporal noise reducer 708 may reduce noise in an occluded region of the image based on the temporally smoothed motion data. A motion-adaptive image enhancer 710 may also process an image based on the temporally smoothed motion data. For example, the motion-adaptive image enhancer 710 may sharpen an occluded region of the image based on the temporally smoothed motion data. In some examples, the motion-adaptive image enhancer 710 may de-saturate color in an occluded region of the image based on the smoothed motion data. In some examples, the motion-adaptive image enhancer 710 may avoid amplifying color in an occluded region of the image based on the smoothed motion data.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

EXAMPLES

Example 1 is an apparatus for image processing. The apparatus includes a motion-adaptive image enhancer to receive motion data and an image with reduced noise. The motion-adaptive image enhancer can also process an occluded region of the image based on the motion data. The motion-adaptive image enhancer can further generate an enhanced image.

Example 2 includes the apparatus of example 1, including or excluding optional features. In this example, the apparatus includes a temporal noise reducer to generate the motion data based on a plurality of consecutively captured frames.

Example 3 includes the apparatus of any one of examples 1 to 2, including or excluding optional features. In this example, the apparatus includes a temporal noise reducer to reduce noise in the occluded region based on the motion data.

Example 4 includes the apparatus of any one of examples 1 to 3, including or excluding optional features. In this example, the apparatus includes a motion data generator to receive a plurality of images comprising the image with reduced noise and generate the motion data.

Example 5 includes the apparatus of any one of examples 1 to 4, including or excluding optional features. In this example, the motion data comprises a sum of an absolute difference between an input frame and a reference frame.

Example 6 includes the apparatus of any one of examples 1 to 5, including or excluding optional features. In this example, the motion data comprises temporally smoothed motion data.

Example 7 includes the apparatus of any one of examples 1 to 6, including or excluding optional features. In this example, the image comprises a low-light image.

Example 8 includes the apparatus of any one of examples 1 to 7, including or excluding optional features. In this example, the motion data comprises a resolution lower than a resolution of the image.

Example 9 includes the apparatus of any one of examples 1 to 8, including or excluding optional features. In this example, the motion-adaptive image enhancer is to sharpen the image based on the motion data.

Example 10 includes the apparatus of any one of examples 1 to 9, including or excluding optional features. In this example, the occluded region corresponds to a moving object.

Example 11 is a method for processing images. The method includes generating, via an image signal processor, motion data based on a plurality of consecutive images. The method also includes temporally smoothing, via the image signal processor, the motion data. The method further includes processing, via the image signal processor, an image based on the temporally smoothed motion data.

Example 12 includes the method of example 11, including or excluding optional features. In this example, generating the motion data comprises summing an absolute difference between an input image and a reference image.

Example 13 includes the method of any one of examples 11 to 12, including or excluding optional features. In this example, temporally smoothing the motion data comprises applying a temporal low pass filter on the motion data.

Example 14 includes the method of any one of examples 11 to 13, including or excluding optional features. In this example, processing the image comprises de-saturating color in an occluded region of the image based on the smoothed motion data.

Example 15 includes the method of any one of examples 11 to 14, including or excluding optional features. In this example, processing the image comprises sharpening an occluded region of the image.

Example 16 includes the method of any one of examples 11 to 15, including or excluding optional features. In this example, processing the image comprises avoiding amplification of color in an occluded region.

Example 17 includes the method of any one of examples 11 to 16, including or excluding optional features. In this example, generating the motion data comprises generating motion data with a resolution lower than a resolution of the image.

Example 18 includes the method of any one of examples 11 to 17, including or excluding optional features. In this example, generating the motion data is performed after a temporal noise reduction and before a motion-adaptive image enhancement.

Example 19 includes the method of any one of examples 11 to 18, including or excluding optional features. In this example, the method includes detecting an occluded region in the image based on the motion data.

Example 20 includes the method of any one of examples 11 to 19, including or excluding optional features. In this example, the method includes generating an enhanced image based on the temporally smoothed motion data.

Example 21 is at least one computer readable medium for processing images using motion data having instructions stored therein that process images based on motion data. The computer-readable medium includes instructions that direct the processor to generate motion data based on a plurality of consecutive images. The computer-readable medium includes instructions that direct the processor to temporally smooth the motion data. The computer-readable medium includes instructions that direct the processor to process an image based on the temporally smoothed motion data.

Example 22 includes the computer-readable medium of example 21, including or excluding optional features. In this example, the computer-readable medium includes instructions to sum an absolute difference between an input image and a reference image.

Example 23 includes the computer-readable medium of any one of examples 21 to 22, including or excluding optional features. In this example, the computer-readable medium includes instructions to apply a temporal low pass filter on the motion data.

Example 24 includes the computer-readable medium of any one of examples 21 to 23, including or excluding optional features. In this example, the computer-readable medium includes instructions to reduce noise in an occluded region of the image based on the temporally smoothed motion data.

Example 25 includes the computer-readable medium of any one of examples 21 to 24, including or excluding optional features. In this example, the computer-readable medium includes instructions to sharpen an occluded region of the image based on the temporally smoothed motion data.

Example 26 includes the computer-readable medium of any one of examples 21 to 25, including or excluding optional features. In this example, the computer-readable medium includes instructions to de-saturate color in an occluded region of the image based on the smoothed motion data.

Example 27 includes the computer-readable medium of any one of examples 21 to 26, including or excluding optional features. In this example, the computer-readable medium includes instructions to avoid amplifying color in an occluded region of the image based on the smoothed motion data.

Example 28 includes the computer-readable medium of any one of examples 21 to 27, including or excluding optional features. In this example, the computer-readable medium includes instructions to detect an occluded region in the image based on the motion data.

Example 29 includes the computer-readable medium of any one of examples 21 to 28, including or excluding optional features. In this example, the computer-readable medium includes instructions to perform temporal noise reduction on the image.

Example 30 includes the computer-readable medium of any one of examples 21 to 29, including or excluding optional features. In this example, the computer-readable medium includes instructions to generate motion data with a resolution lower than a resolution of the image.

Example 31 is a system for image processing. The system includes a processor. The system includes a motion-adaptive image enhancer communicatively coupled to the processor. The motion adaptive image enhancer can receive motion data and an image with reduced noise. The motion adaptive image enhancer can also process an occluded region of the image based on the motion data. The motion adaptive image enhancer can further generate an enhanced image.

Example 32 includes the system of example 31, including or excluding optional features. In this example, the system includes a temporal noise reducer to generate the motion data based on a plurality of consecutively captured frames.

Example 33 includes the system of any one of examples 31 to 32, including or excluding optional features. In this example, the system includes a temporal noise reducer to reduce noise in the occluded region based on the motion data.

Example 34 includes the system of any one of examples 31 to 33, including or excluding optional features. In this example, the system includes a motion data generator to receive a plurality of images comprising the image with reduced noise and generate the motion data.

Example 35 includes the system of any one of examples 31 to 34, including or excluding optional features. In this example, the motion data comprises a sum of an absolute difference between an input frame and a reference frame.

Example 36 includes the system of any one of examples 31 to 35, including or excluding optional features. In this example, the motion data comprises temporally smoothed motion data.

Example 37 includes the system of any one of examples 31 to 36, including or excluding optional features. In this example, the image comprises a low-light image.

Example 38 includes the system of any one of examples 31 to 37, including or excluding optional features. In this example, the motion data comprises a resolution lower than a resolution of the image.

Example 39 includes the system of any one of examples 31 to 38, including or excluding optional features. In this example, the motion-adaptive image enhancer is to sharpen the image based on the motion data.

Example 40 includes the system of any one of examples 31 to 39, including or excluding optional features. In this example, the occluded region corresponds to a moving object.

Example 41 is a system for image processing. The system includes means for receiving motion data and an image with reduced noise. The system also includes means for processing an occluded region of the image based on the motion data. The system further includes means for generating an enhanced image.

Example 42 includes the system of example 41, including or excluding optional features. In this example, the system includes means for generating the motion data based on a plurality of consecutively captured frames.

Example 43 includes the system of any one of examples 41 to 42, including or excluding optional features. In this example, the system includes means for reducing noise in the occluded region based on the motion data.

Example 44 includes the system of any one of examples 41 to 43, including or excluding optional features. In this example, the system includes means for receiving a plurality of images comprising the image with reduced noise and generate the motion data.

Example 45 includes the system of any one of examples 41 to 44, including or excluding optional features. In this example, the motion data comprises a sum of an absolute difference between an input frame and a reference frame.

Example 46 includes the system of any one of examples 41 to 45, including or excluding optional features. In this example, the motion data comprises temporally smoothed motion data.

Example 47 includes the system of any one of examples 41 to 46, including or excluding optional features. In this example, the image comprises a low-light image.

Example 48 includes the system of any one of examples 41 to 47, including or excluding optional features. In this example, the motion data comprises a resolution lower than a resolution of the image.

Example 49 includes the system of any one of examples 41 to 48, including or excluding optional features. In this example, means for processing an occluded region of the image is to sharpen the image based on the motion data.

Example 50 includes the system of any one of examples 41 to 49, including or excluding optional features. In this example, the occluded region corresponds to a moving object.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for image processing, comprising:
a processor to:
receive an image, a previous image with reduced noise, and stored motion data for the previous image;

generate motion data comprising a sum of absolute differences between the image and the previous image;

temporally smooth the motion data based on the stored motion data for the previous image using a temporal low pass filter;

detect an occluded region in the image based on the temporally smoothed motion data;

sharpen or desaturate color in the detected occluded region of the image based on the temporally smoothed motion data; and generate an enhanced image comprising the sharpened or desaturated region.

2. The apparatus of claim 1, wherein the processor is to reduce noise in the occluded region based on the motion data.

3. The apparatus of claim 1, wherein the processor is to receive a plurality of images comprising the image with reduced noise and generate the motion data.

4. The apparatus of claim 1, wherein the image comprises a low-light image.

5. The apparatus of claim 1, wherein the motion data comprises a resolution lower than a resolution of the image.

6. The apparatus of claim 1, wherein the processor is to sharpen the image based on the motion data.

7. The apparatus of claim 1, wherein the occluded region corresponds to a moving object.

8. The apparatus of claim 1, wherein the processor is to process the occluded region and a remaining portion of the image such that a noise level of the occluded region and the remaining portion in the enhanced image appears uniform.

9. The apparatus of claim 1, wherein the enhanced image comprises enhanced color vividness with reduced chrominance noise.

10. The apparatus of claim 1, wherein the image is captured in light conditions comprising a luminous flux of less than 0.1.

11. The apparatus of claim 1, wherein the processor is to de-saturate the color in the occluded regions of the image based on the temporally smoothed motion data while enhancing color at static regions of the image.

12. The apparatus of claim 1, wherein the processor comprises a hardware image processing pipeline comprising a temporal noise reducer, a motion data buffer communicatively coupled to an output and an input of the temporal noise reducer to store the stored motion data for the previous image and send the stored motion data to the temporal noise reducer for detecting the occluded region in the image, an output buffer communicatively coupled to an output and an input of the temporal noise reducer to store the previous image with reduced noise, and a motion adaptive image enhancer coupled to the temporal noise reducer, wherein the temporal noise reducer and the motion adaptive image enhancer are to process frames in parallel.

13. A method for processing images, comprising:

generating, via an image signal processor, motion data for an image, the motion data comprising a sum of absolute differences between the image and a previous consecutive image;

temporally smoothing, via the image signal processor, the motion data based on stored motion data for a previous image using a temporal low pass filter, wherein the motion data has a lower resolution than the previous image and the image;

detecting, via the image signal processor, an occluded region in the image based on the temporally smoothed motion data; and sharpening or desaturating color, via the image signal processor, in the occluded region in the image based on the temporally smoothed motion data.

14. At least one computer readable medium for processing frames using motion data having instructions stored therein that process images based on motion data, in response to being executed on a computing device, cause the computing device to:

generate motion data for an image, the motion data comprising a sum of absolute differences between the image and a previous consecutive image;

temporally smooth the motion data based on stored motion data for a previous image using a temporal low pass filter;

detect an occluded region in the image based on the temporally smoothed motion data;

sharpen or desaturate color in the detected occluded region of the image based on the temporally smoothed motion data; and generate an enhanced image comprising the sharpened or desaturated region.

15. The at least one computer readable medium of claim 14, comprising instructions to reduce noise in the occluded region of the image.

* * * * *